(12) United States Patent
Hantsch et al.

(10) Patent No.: US 7,568,012 B2
(45) Date of Patent: Jul. 28, 2009

(54) METHOD AND DEVICE FOR FORWARDING SHORT MESSAGES FROM A MOBILE TERMINAL

(75) Inventors: Maximilian Hantsch, Vienna (AT); Karl Guggisberg, Comano (CH)

(73) Assignee: Universal Communication Platform AG, Vienna (AT)

( * ) Notice: Subject to any disclaimer, the term of this patent is extended or adjusted under 35 U.S.C. 154(b) by 657 days.

(21) Appl. No.: 10/111,316

(22) PCT Filed: Feb. 14, 2002

(86) PCT No.: PCT/AT02/00049
§ 371 (c)(1),
(2), (4) Date: Sep. 18, 2002

(87) PCT Pub. No.: WO02/065795
PCT Pub. Date: Aug. 22, 2002

(65) Prior Publication Data
US 2003/0154257 A1    Aug. 14, 2003

(51) Int. Cl.
G06F 15/16    (2006.01)
H04W 4/12    (2006.01)
(52) U.S. Cl. ......................... 709/207; 455/433
(58) Field of Classification Search .............. 455/433; 709/207
See application file for complete search history.

(56) References Cited

U.S. PATENT DOCUMENTS

| | | | | |
|---|---|---|---|---|
| 5,719,918 A | * | 2/1998 | Serbetciouglu et al. | 380/271 |
| 5,768,509 A | | 6/1998 | Gunluk | 395/200.33 |
| 5,867,787 A | * | 2/1999 | Vudali et al. | 455/445 |
| 5,878,347 A | | 3/1999 | Joensuu et al. | 455/433 |
| 6,125,281 A | * | 9/2000 | Wells et al. | 455/466 |
| 6,134,441 A | | 10/2000 | Astrom et al. | 455/445 |
| 6,188,887 B1 | * | 2/2001 | Joong et al. | 455/417 |
| 6,263,212 B1 | * | 7/2001 | Ross et al. | 455/466 |

(Continued)

FOREIGN PATENT DOCUMENTS

DE    20000850    6/2000

(Continued)

OTHER PUBLICATIONS

"Virtual Network Milborne White Paper", Telesoft Technologies, 2002.*

(Continued)

*Primary Examiner*—Kenny S Lin
*Assistant Examiner*—Julian Chang
(74) *Attorney, Agent, or Firm*—Zilka-Kotab, PC

(57) ABSTRACT

Short messages sent by a mobile terminal from a foreign network are routed to an external short-message entity. An external short-message entity, which runs on a computer in a data network, is reached from a mobile telephone from any desired foreign network. The inquiry of the short-message service center of the foreign network to the home network occurs at a virtual home location register of the home network, based on the receiver number of the external short-message entity. The virtual home location register replies to the inquiry with an acknowledgement containing information on a virtual mobile switching center of the home network, via which the short message (SMS) which is to be transmitted to the external short-message entity.

24 Claims, 4 Drawing Sheets

U.S. PATENT DOCUMENTS

| | | | |
|---|---|---|---|
| 6,292,669 B1 | 9/2001 | Meuronen et al. | 455/466 |
| 6,317,594 B1 * | 11/2001 | Gossman et al. | 455/414.1 |
| 6,512,926 B1 * | 1/2003 | Henry-Labordere | 455/445 |
| 7,116,994 B2 * | 10/2006 | Hatch | 455/466 |
| 2003/0003930 A1 * | 1/2003 | Allison et al. | 455/466 |
| 2003/0018806 A1 * | 1/2003 | Rueger et al. | 709/238 |

FOREIGN PATENT DOCUMENTS

| | | |
|---|---|---|
| EP | 1294204 A1 * | 3/2003 |
| GB | 2 351 880 | 1/2001 |
| WO | WO 97/36450 | 10/1997 |
| WO | WO 98/56195 | 12/1998 |
| WO | WO 00/47004 | 8/2000 |

OTHER PUBLICATIONS

Martini, G. et al, "Distributed Architecture for Applications based on the GSM Short Message Service," International Workshop on Services in Distributed and Networked Environments, Jun. 5, 1995, pp. 140-145.

Short Message Peer to Peer Protocol. Specification v3.4, SMPP Developers Forum, Document Version Oct. 12, 1999, Issue 1.2, pp. 1, 12 and 13.

* cited by examiner

METHOD AND DEVICE FOR FORWARDING SHORT MESSAGES FROM A MOBILE TERMINAL

The present invention relates to a method for routing a short message, for instance a mobile telephone, from a foreign network to a receiver within the home network of the mobile terminal, which receiver is an external short-message entity having a receiver number and being different from a mobile terminal and connected with the home network, for instance a computer, wherein a short message-service center of the foreign network transmits an inquiry about the validity and availability of the receiver number of the external short-message entity to the home network.

Furthermore, the invention relates to a device for carrying out such a method, including a short-message service center in the foreign network of the mobile terminal transmitting the short message and an external short-message entity having a receiver number and being different from a mobile terminal of the home network, said external short-message entity being connected with the home network.

The term "home network" serves to denote that mobile radio network which belongs to a respective mobile terminal, for instance a mobile telephone. The term "foreign network" encompasses all the other mobile radio networks in which the mobile terminal can also be operated, for instance, based on roaming agreements.

In order to transmit short messages, a data service was created in GSM (global systems for mobile communication)-based mobile radio networks, which became known under the acronym SMS (short messages system). That data service is employed to rapidly and cheaply transmit of short messages limited to 160 alphanumeric characters, between mobile telephones or terminals. In addition to texts, also images or tones can be sent via SMS. The limitation to 160 signs per short message is implied by the technology of the terminals, for instance mobile telephones. This data service in the first place is used to send short messages from a mobile terminal, e.g. a mobile telephone, to another mobile terminal. To this end, the user of a mobile telephone keys in a short text message and subsequently delivers the same to the telephone number of the receiver. As the message arrives on the mobile telephone of the receiver, the receiver is notified by an audio or vibration signal, whereupon he can make the message appear on the display of his mobile telephone to read the same.

In addition, the short message service has also been used for the communication with external software applications to an increasing extent. In this manner, short messages are, for instance, sent from a software application to a mobile terminal, or a mobile terminal transmits a short message to a software application with which an automated dialog is established. Such external software applications are called external short message entities (ESMEs). A typical example of the variant of transmitting short messages from one software application to a mobile terminal is the mailing of weather information or traffic information, news or the like, and an example of the second variant of communication between a mobile terminal and a software application may reside in the interrogation of information on stock exchange rates or balances of accounts by the owner of a mobile telephone.

In order to transmit short messages between two mobile telephones, the desired short message is input by the sender via the keyboard of a mobile telephone and sent. After the short message has reached the short-message service center (SMSC) of the respective mobile telephone network provider, it is usually temporarily stored there. The short-message service center (SMSC) tries to route the SMS short message to the receiver by mailing a send information called send routing information (SRI) to a register containing information on the subscribers' addresses (HLR—home location register). By way of the receiver number, the receiver can be localized in the HLR register. The HLR register replies to the short-message service center (SMSC) by giving the address of the relevant mobile switching center and information sent from the short-message service center to the respective mobile switching center along with the short message. The respective mobile switching center (MSC) searches the subscriber or the respective base station in that cell in which the subscriber is at that moment, and sends the short message to that base station, from which it is finally transmitted to the mobile telephone. The transmission within the mobile telephone network usually occurs according to the socalled SS7 (signaling system no. 7) protocol.

The transmission of a short message from a mobile terminal, for instance a mobile telephone, to an external short-message receiver, for instance a computer, or the other way round, is usually effected via the short-message service center of the respective network provider that establishes the respective connection to the respective data network in which the respective external short-message receiver, for instance a computer is to be found. This requires, however, an appropriate data line between the telecommunication network provider and the data network, for instance the internet, in which the computer is arranged. As soon as the owner of a mobile telephone is in a foreign network, communication with an external short-message receiver can take place only if the respective foreign network provider does make available such a data connection to the data network comprising the computer. This has proved to be practically impossible, in particular for globally active providers of such external short-message receivers (software applications).

Providers of such external short-message stations such as, e.g., software applications in data networks such as the internet, may certainly evade the short-message service centers of the respective telecommunication network provider by connecting their application directly with a mobile terminal, for instance a mobile telephone, which receives the incoming short messages via the radio link and then routes it directly to the external short-message station. But this solution is suitable for very small datasets only. Moreover, this enables an external short-message station to receive only those short messages which are sent exactly to the destination number of the connected mobile terminal. Yet, a large number of destination numbers is frequently required simultaneously or in a row.

An appropriate connection to the short-message service center of the respective mobile telephone network is also required for the data exchange from the external short-message station, for instance a software application, to a mobile terminal. This applies, in particular, to dialog-oriented applications by means of short messages.

U.S. Pat. No. 5,768,509 A, for instance, describes a method for sending short messages via telecommunication networks and a corresponding short-message service center. The method filters short messages and transmits a short message only if it is has been found out that it is allowed to. Otherwise, the short messages temporarily stored in the short-message service center are destroyed. The connection between the short-message service center of the network provider and external entities such as voice mail, e-mail or computer terminals is accomplished via an appropriate interface which carries out the conversion to the TCP/IP (transmission control protocol/internet protocol) protocol. The communication between the short-message service center and the mobile telephone occurs according to the SS7 (signaling system no. 7) protocol. The standard relating to the transmission protocol for transmissions of short messages between mobile telephones is defined in GSM specification 03.40.

GB 2 351 880 A describes a method for routing short messages to a subscriber of a foreign mobile radio network that is not connected with the home mobile radio network by roaming agreements. To this end, the short message consists of predetermined data fields containing inter alia the number of the short-message service center of the home mobile radio network as well as a numbering scheme containing the numbers of the short-message service centers and the possible connections between different short-message service centers and the mobile switching centers of the respective mobile radio networks as well as a numbering-scheme manager defining the transmission to the respective transmission center of the mobile telephone to be reached.

WO 00/47004 A1 describes a method and a device pertaining to the subject matter, by which a short message is transmitted to a receiver based on the receiver number of the external short-message entity via a special conversion unit. The special conversion site assumes the role of a usually employed visitor location register and a mobile switching center (MSC), wherein an inquiry is still directed to the real home location register of the home network, which responds with information on the localization of the receiver. It is, thus, the task of that special conversion unit to inform the real home location register on the location and status of the allocated numbers as a visitor location register. The real home location register, which, as a rule, is implemented by a very specific and expensive device, is additionally stressed by the transmission of short messages to external short-message entities different from a mobile terminal. The entry into a home location register comprising a number of functionalities specifically for moving receivers would constitute an unjustified expenditure, in particular for external short-message entities that do not change their locations, for instance software applications.

It is the object of the present invention to provide a method for routing short messages from external mobile radio networks to an external short-message receiver, which method does not require a data line between said external short-message receiver and the short-message service center of each mobile telephone network in question, thus enabling a wide application and availability of external short-message receivers, and hence great acceptance. Similarly, it is an object of the invention to provide a suitable device that enables the realization of said method.

The object according to the invention in procedural terms is achieved in that the inquiry of the of the short-message service center of the foreign network to the home network occurs at a virtual home location register of the home network, based on the receiver number of the external short-message entity, which virtual home location register replies to the inquiry with an acknowledgment containing information on a virtual mobile switching center of the home network, via which the short message is to be transmitted to the external short-message entity. Although the receiver number of the external short-message entity is no real mobile telephone, the presence of a real terminal is simulated to the short-message service center, thus enabling the effective routing of a short message to an external short-message entity, for instance a software application, even from a foreign network. The acknowledgment of the home network on the inquiry of the short-message service center of the foreign network contains information on a virtual mobile switching center of the home network, via which the short message is to be transmitted to the external short-message entity. The home network replies to the inquiry of the short-message service center of the foreign network like a virtual HLR register, although such an HLR register is activated only by real mobile terminals of the home network. In the virtual HLR register, the allocation of the admissible external short-message entities occurs by way of the receiver numbers of the pretended real mobile terminals. After the acknowledgment by the virtual HLR register, the short message is conveyed to the external short-message entity via a virtual mobile switching center within the home network. The virtual HLR register simulates the presence of a mobile telephone to the foreign network, whereupon the short-message service center of the foreign network routes the short message to the virtual mobile switching center and, after this, to the external short-message entity or software application, respectively. The method according to the invention obviates the use of a home location register in the home network when routing short messages to special external short-message entities different from mobile terminals, whereby those usually very complex and expensive devices can be saved for mobile receivers. For the external short-message entities, for instance software applications, to which short messages are to be delivered, special entries in a virtual home location register, which are substantially more easy to implement and maintained, will actually do. Unlike the prior art, according to which the home location register is queried for the respective location of the receiver, the short-message service center in the method according to the invention does not send a query to a real home location register, since the respective data in regard to the availability of the receiver are filed in the virtual home location register. The inquiry at this socalled virtual home location register, which assumes the function of a real home location register, is carried out based on a given receiver number that is reserved, for instance, to certain external short-message entities such as, e.g., software applications. This renders feasible the implementation of, for instance, a plurality of receiver numbers in the virtual home location register without major expenses and without necessitating entries in the highly specific real home location register. Communication between the virtual mobile switching center and a real home location register is omitted in the method according to the invention, because the virtual mobile switching center and the virtual home location register are realized as a unit, for instance a single computer. The realization of the connection of external software applications is, therefore, effected using, for instance, a computer unit on which no such high demands are set as are on real home location registers. The maintenance and new entry of receiver numbers of external short-message entities is, thus, substantially facilitated, whereby also large numerical series called numerical channels can be implemented. In real home location registers, this would involve high expenditures and in some cases would not be possible at all, since, for instance, the desired amount of numbers or a certain receiver number is not free in the home location register.

Advantageously, the inquiry of the short-message service center of the foreign network to the home network and the reply of the home network to the short-message service center of the foreign network as well as the transmission of the short message to the virtual mobile switching center are accomplished using an SS7 (signaling system no. 7) protocol, which constitutes the usual standard in GSM networks.

According to another characteristic feature of the invention, it is provided that the transmission of the short message between the virtual mobile switching center and the external short-message entity, or a data network comprising the external short-message entity, for instance the internet, is accomplished using a TCP/IP (transmission control protocol/internet protocol)-based protocol, which is usually employed in computer networks. In this respect, the short message peer-to-peer protocol (SMPP) is preferred.

The object according to the invention is also achieved by a device for carrying out the above-defined method, which is characterized in that a computer unit is provided in the home network, which, upon inquiry of the short-message service center of the foreign network whether the receiver number of the external short-message entity is valid and available, replies with an instruction containing the acknowledgment of the validity of the receiver number of the external short-message entity and information on a virtual mobile switching center to which the short message is to be sent. This computer unit in the simplest case is a single computer which assumes the functions of both the virtual home location register and the virtual mobile switching center.

The external short-message entity advantageously is comprised of a computer arranged in a data network, for instance the internet, on which a defined software application is implemented.

The connection between the computer in the data network and the home mobile radio network preferably is comprised of a network connection.

In the following, the invention will be explained in more detail by way of exemplary embodiments with reference to the accompanying drawing, wherein.

Figure 1:
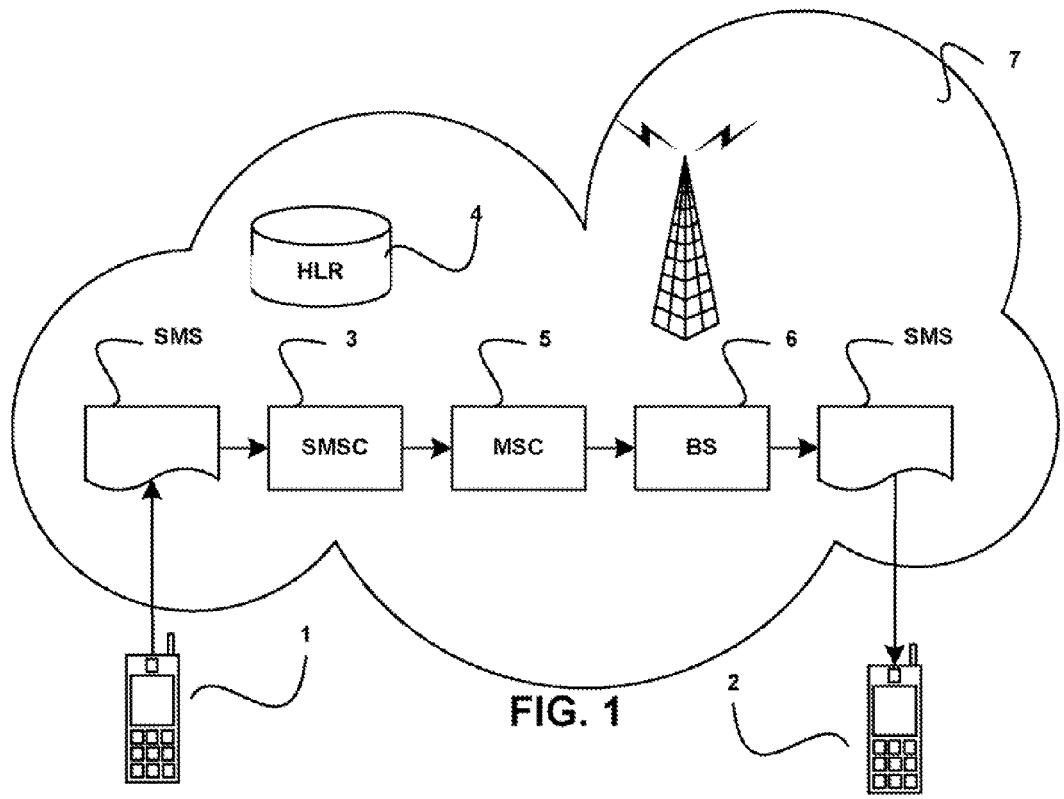
FIG. 1 is a schematic block diagram illustrating the transmission of short messages between two mobile telephones.

FIG. 1 is a schematic block diagram illustrating the transmission of short messages between two mobile telephones 1, 2, or mobile terminals. A short message SMS is produced from a mobile telephone 1 and delivered to the short-message service center SMSC 3 of the mobile network provider. The short-message service center 3 sends a socalled send routing information SRI to the home location register HLR 4, which, by way of the receiver number to which the short message SMS is to be transmitted, localizes the receiver and replies to the short-message service center 3 with the respective information. Such information contains data on the instantaneous location of the called mobile telephone 2. The short-message service center 3 will, thus, know to which mobile switching center MSC 5 the short message SMS is to be transmitted. The short-message service center 3 forwards the temporarily stored short message SMS along with the information obtained from HLR register 4 to the pertinent mobile switching center 5, which, in the end, sends the short message SMS to that base station (BS) 6 which belongs to the cell in which the receiver mobile telephone 2 is at that very instant. From the base station 6, the short message SMS finally reaches the mobile telephone 2 of the receiver, where the latter is informed on the arrival of a short message SMS, for instance, by an acoustic signal. The block diagram of FIG. 1 illustrates the transmission of short messages SMSs between two mobile telephones 1, 2 in their own home network 7. If the mobile telephone 1 of the transmitter is in a foreign mobile radio network, the short-message service center SMSC of the foreign network will send the respective inquiry (SRI) to the HLR register 4 of the mobile radio network 7 belonging to the mobile telephone 1 and receive from the same the respective information, i.e., to which mobile switching center 5 of the mobile radio network 7 the short message SMS is to be sent.

Figure 2:
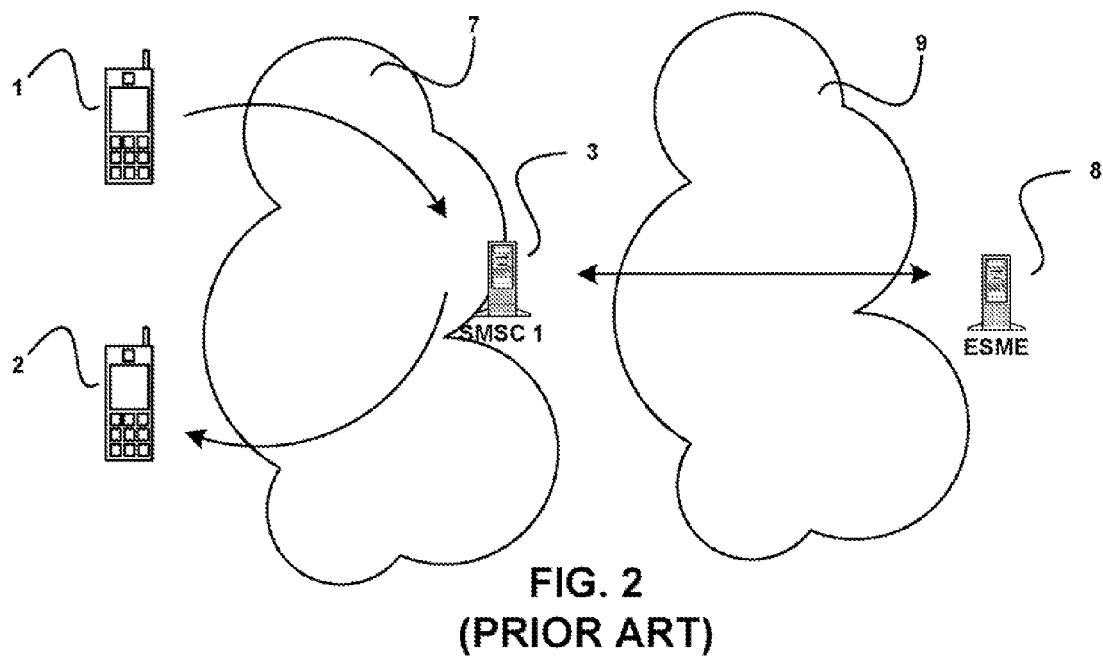
FIG. 2 is a schematic block diagram illustrating the transmission of short messages between mobile telephones in their own mobile-phone network as well as between mobile telephones and an external short-message entity according to the prior art.

FIG. 2 illustrates a home network 7 and two mobile terminals, for instance mobile telephones 1, 2, belonging to this home network 7. When sending a short message from one mobile telephone 1 to a second mobile telephone 2 of the mobile radio network 7, the short message SMS is transmitted to the short-message service center SMSC 3 of the mobile radio network 7 in accordance with the rule described in respect to FIG. 1, the short message SMS is routed to the pertinent mobile switching center and finally routed to the respective base station and to the mobile telephone 2. If a short message SMS is sent via a mobile telephone 1 to an external short-message entity or software application, which is represented in FIG. 2 by way of a computer 8 and arranged in a data network 9 such as, for instance, the internet, the short message SMS is transmitted from the short-message service center 3 into the data network 9 and hence to the computer 8. To this end, an appropriate gateway (not illustrated) is necessary, which carries out the conversion of the short message SMS into a protocol usually applied in the data network 9. With the home network 7 being connected with the data network 9, a conversion into the TCP/IP protocol will, for instance, be accomplished. A suitable connection between the short-message service center 3 and the data network 9 is, however, absolutely required to obtain a data exchange between the mobile telephones 1, 2 and the external computer 8. This connection may be realized by a permanent data connection, which will involve high rental charges for the service provider of the data network 9. This becomes even more critical as there is a number of different mobile radio networks and the connection to any of these mobile radio networks must be safeguarded in order to ensure the global availability of the computer 8, and hence the software application, in the data network 9.

Figure 3:
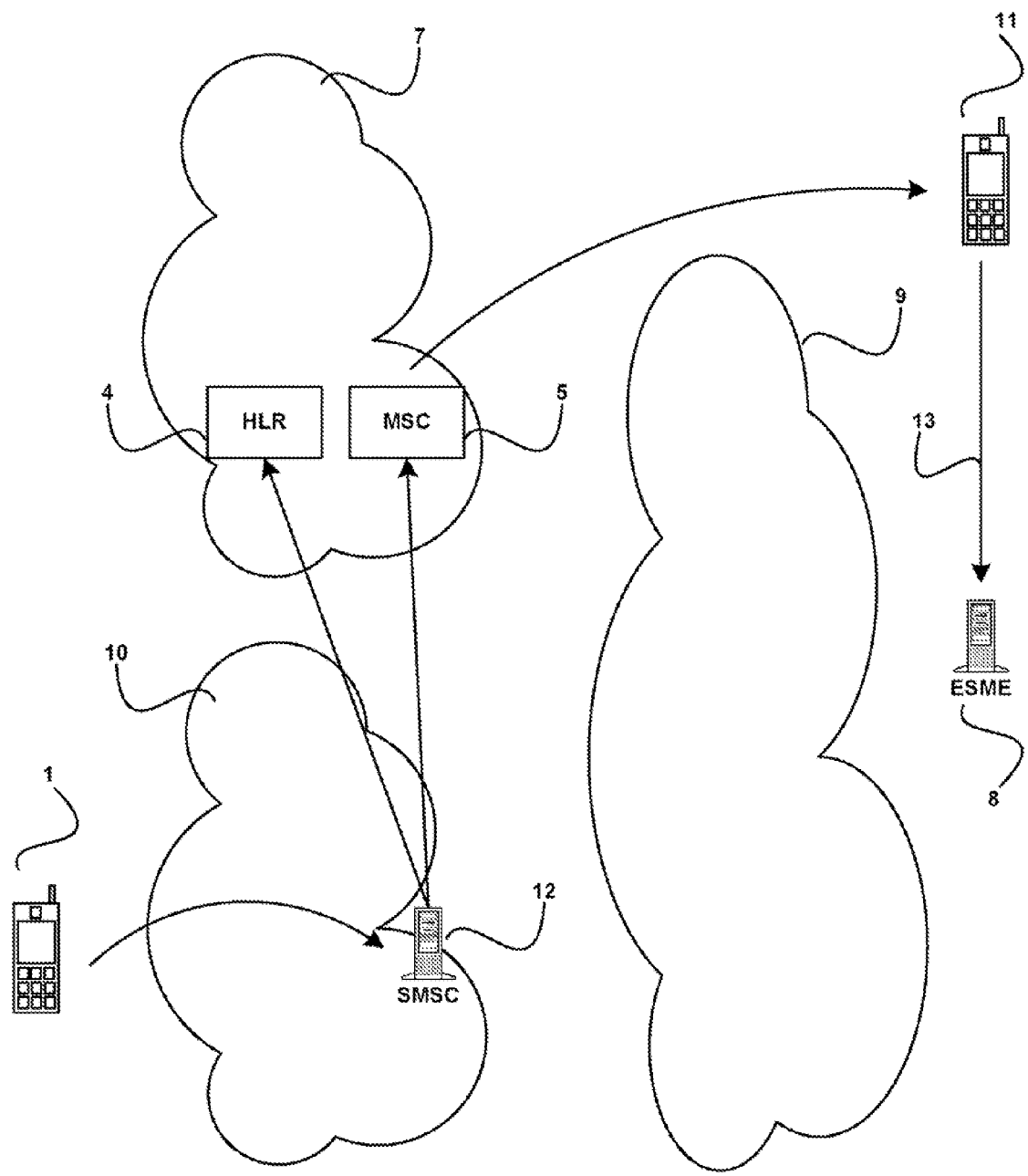
FIG. 3 illustrates the transmission of a short message from a mobile telephone to a software application via a foreign mobile radio network according to the prior art.

FIG. 3 is a schematic block diagram illustrating the transmission of short messages between a mobile telephone 1 and a foreign network 10 to a software application using a mobile radio connection. In the instant case, the computer 8 of the data network 9 on which the desired software application runs is connected with a further mobile telephone 11 of the mobile radio network 7 so as to make the mobile telephone 11 and not the computer 8 the receiver of the SMS of the mobile telephone 1. The transmission of the short message SMS from mobile telephone 1 to mobile telephone 11 occurs in a manner similar to that described in FIG. 1 with the exception that the short-message service center 12 of the foreign network 10 delivers the inquiry to the HLR register 4 of its own mobile radio network 7 and receives the respective information on the location of the mobile telephone 11 in the home network 7, whereupon the short message SMS is transmitted to the respective mobile switching center 5 of the mobile radio network 7 and, further on, to the mobile telephone 11. The connection 13 between the computer 8 and the mobile telephone 11 must be permanently available. This technique renders a data connection between the home network 7 and the computer 8, or the data network 9, as described in FIG. 2 superfluous. Thus, the computer 8 will even be reached by foreign-network mobile telephones. This involves, however, the disadvantage that the connection 13 between the computer 8 and the mobile telephone 11 admits only limited datasets. Moreover, this technique merely enables the transmission of short messages SMSs from a computer 8 to one mobile telephone 11 each per connection 13, which constitutes an inadmissible restriction in many cases, because frequently a large number of destination numbers are to be reached by software applications simultaneously or in a row.

Figure 4:
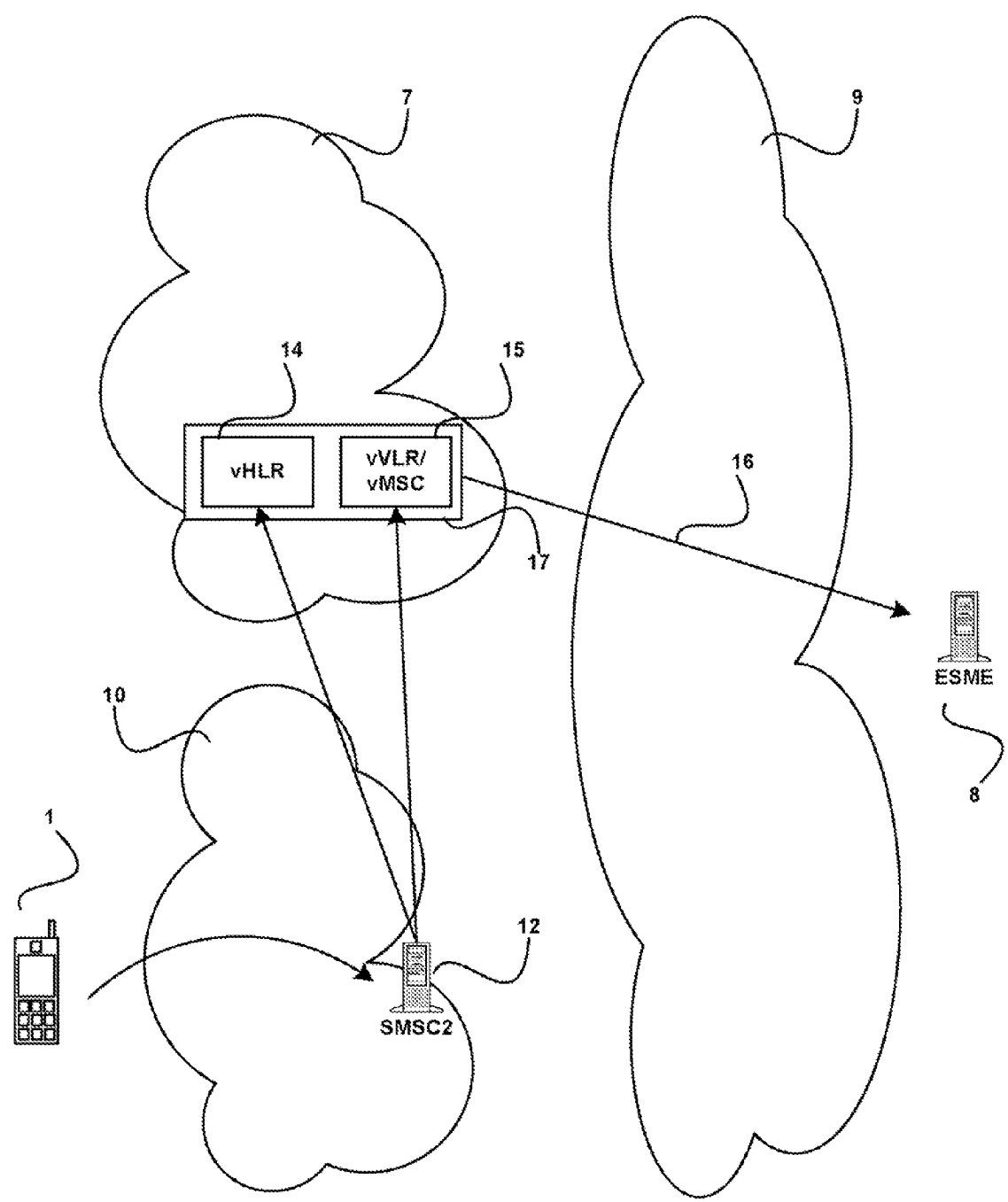
FIG. 4 is a schematic block diagram illustrating the transmission of short messages from a mobile terminal to an external short-message entity via a foreign mobile radio network according to the present invention.

FIG. 4 is a schematic block diagram illustrating the transmission of short messages from a mobile terminal, for instance a mobile telephone 1, to a software application on a computer 8 via a foreign mobile radio network 10 according to the present invention. It is anticipated that the short-message service center 12 of the foreign network 10 does not ready a connection to the desired computer 8. According to the invention, it is provided that the external short-message entity 8, for instance the computer 8 in the data network 9, is no longer connected with the short-message service center SMSC of a mobile radio network 7, 10 as usual, but with a virtual mobile switching center 15 referred to as the virtual visitor location register and including the virtual mobile switching center vVLR/vMSC. The connection between the virtual mobile switching center 15 and the data network 9, for instance the internet, is accomplished via a network connection 16. If such a mobile terminal, for instance a mobile telephone 1, sends a short message SMS to a computer 8 in a foreign network 10, the short message SMS will at first arrive at the short-message service center 12 of the foreign network 10. Based on the receiver number, the short-message service center 12 of the foreign network 10 will inquire at a virtual HLR register 14 of the mobile radio network 7 belonging to the mobile telephone 1, whether the receiver number is a real mobile telephone of the mobile radio telephone network 7. Some receiver numbers may, for instance, be reserved to software applications. The virtual HLR register 14 sends a reply, informing the short-message service center 12 of the existence of the respective mobile telephone and its entry into the virtual visitor location register 15. After this, the short-message service center 12 of the foreign network 10 transmits the short message SMS to the virtual mobile switching center 15 and, finally, via the network connection 16 to the IP data network 9, for instance the internet, and further to the computer 8. In doing so, the communication between the foreign network 10 and the home network 7 is accomplished through established signaling and communication channels between mobile radio telephone networks. The peculiarity of the invention resides in that the virtual home location register 14 in the home network 7 pretends to the short-message service center 12 of the foreign network 10 (or any short-message service center of any other mobile radio network) that the destination number of the computer 8 is a reception number of a mobile terminal unit checked in the virtual mobile switching center 15 (virtual visitor location register—vVLR). The virtual mobile switching center 15 accepts short messages SMSs from any desired mobile radio networks, which are sent via the respectively relevant short-message service center to the receiver number of the computer 8, and routes them to the computer 8 via the network communication 16. The virtual HLR register 14 and the virtual mobile switching center 15 are each software modules that may be implemented on a computer 17. This computer 17 also comprises the appropriate interface towards the network connection 16 to the external short-message entity implemented by the computer 8.

Figure 5:
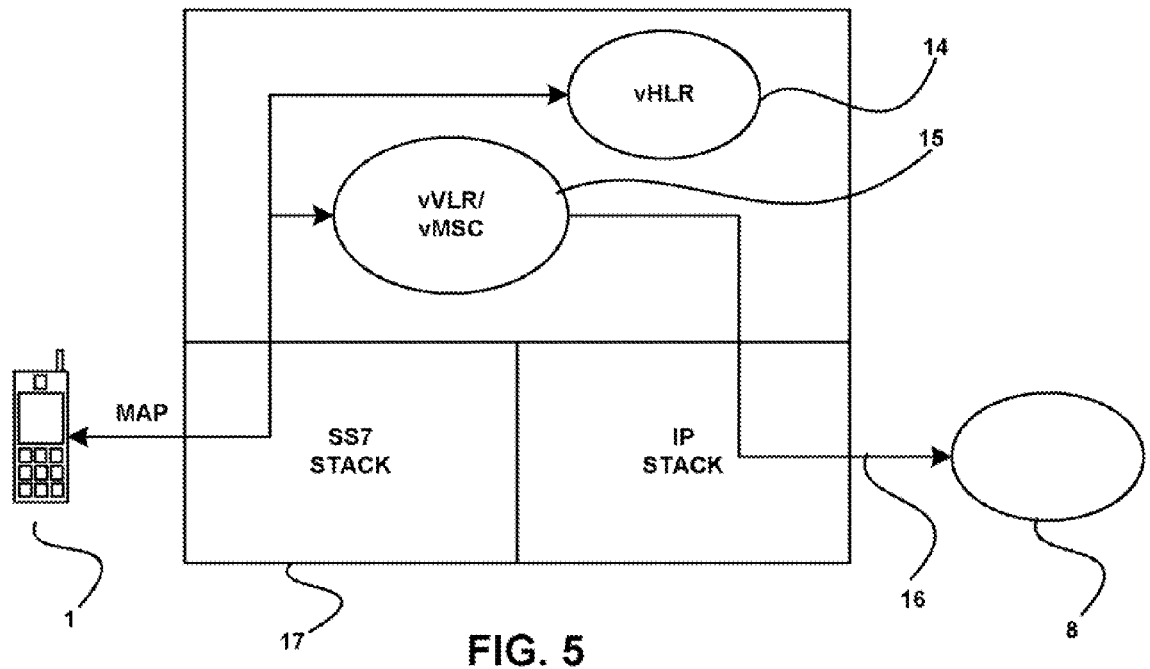
FIG. 5 is a basic block diagram illustrating the method according to the invention.

FIG. 5 is a basic sketch illustrating the method steps of the method according to the invention. A mobile unit, for instance a mobile telephone 1, communicates via a socalled mobile application part layer (MAP layer) of the signaling layer of a mobile network with the virtual HLR register 14 and the virtual mobile switching center 15, which may be implemented on a computer 17. After this, the virtual mobile switching center 15 routes the short messages SMSs to a computer 8, or the software application, via a network connection 16. The transmission between the virtual mobile switching center 15 and the computer 8 in the computer network occurs, for instance, under the short message peer-to-peer protocol (SMPP) and, in particular, the protocol data unit (PDU) DELIVER$_{13}$SMS defined there.

Figure 6:
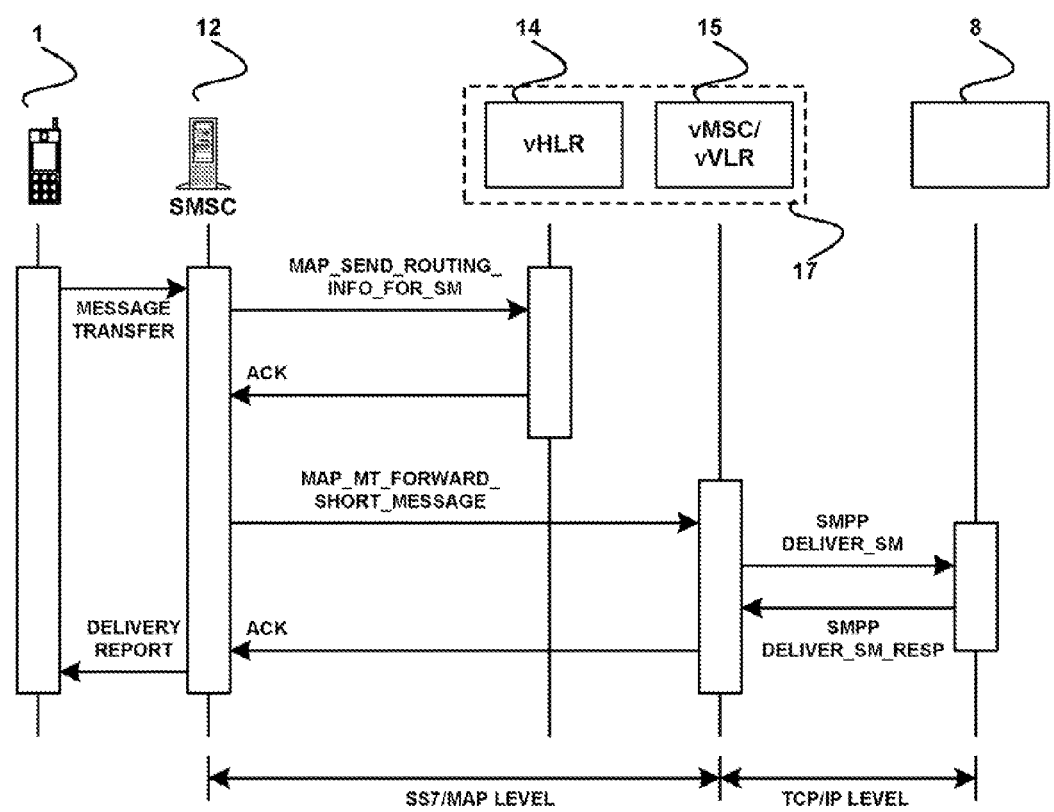
FIG. 6 is another principal block diagram illustrating the method steps according to the invention.

FIG. 6 is another representation illustrating the method steps according to the invention applied in the communication between a mobile telephone 1 and an external computer 8, for instance a software application on the internet. The short-message service center 12 of the foreign network which receives the short message SMS from the mobile telephone 1 sends a MAP (mobile application part) command MAP_SEND_ROUTING_INFO_FOR_SM to the virtual HLR register 14, which replies with a data package ACK containing, inter alia, the global title, i.e., the address in the global telephony addressing network of the virtual mobile switching center 15. The short-message service center 12 directs the short message SMS to the respective virtual mobile switching center 15 by the MAP command MAP_MT_FORWARD_SHORT_MESSAGE. This virtual mobile switching center 15 uses the short message peer-to-peer protocol (SMPP) to transmit the short message SMS by the instruction DELIVER_SM further to the computer 8, which, in turn, acknowledges processing to the virtual mobile switching center 15 by the command DELIVER_SM_RESP in the SMPP protocol. Next, the virtual mobile switching center 15, in turn, sends an acknowledgment to the short-message service center 12, from where an acknowledgment on the proper reception of the short message SMS is sent on to the mobile telephone 1. To this end, the mobile telephone 1 has to be configured such that an acknowledgment will be expected from the short-message service center 12. As is clearly apparent from FIG. 6, the communication between the short-message service center 12 and the virtual mobile switching center 15 takes place in the usual SS7 (signaling system no. 7) protocol, while the communication between the virtual mobile switching center 15 and the computer 8 takes place in the data network, for instance in the TCP/IP (transmission control protocol/internet protocol) protocol. The virtual HLR register 14 in the home network 7 generates the information required for the routing of the short message SMS to an external short-message entity—ESME such that said information can be routed to a virtual mobile switching center 15 and, further on, to a computer 8 along with the short message SMS. In this manner, it is feasible to establish a connection between a mobile telephone of any desired mobile radio network and a software application comprising a physical connection to only one mobile radio network provider. This ensures the global availability of the software application and hence a high acceptance. On the other hand, a plurality of mobile terminals can be reached with short messages SMSs from the software application in a row or simultaneously.

The invention claimed is:

1. A system for routing short messages (SMS) sent by a mobile terminal, including a mobile telephone, from a foreign network to a receiver within a home network of the mobile terminal, which receiver is an external short-message entity having a receiver number and being different from a mobile terminal and connected with the home network, including a computer, wherein a short message-service center of the foreign network transmits an inquiry about the validity and availability of the receiver number of the external short-message entity to the home network, characterized in that the inquiry of the short-message service center of the foreign network to the home network occurs at a virtual home location register of the home network, based on the receiver number of the external short-message entity, which virtual home location register replies to the inquiry with an acknowledgment containing information on a virtual mobile switching center of the home network, via which the short message (SMS) is to be transmitted to the external short-message entity;

wherein included is a short-message service center in the foreign network of the mobile terminal sending the short message (SMS) and an external short-message entity having a receiver number and being different from a mobile terminal of the home network, said external short-message entity being connected with the home network, characterized in that a computer unit is provided in the home network, which, upon inquiry of the short-message service center of the foreign network whether the receiver number of the external short-message entity is valid and available, replies with an instruction containing the acknowledgment of the validity of the receiver number of the external short-message entity and information on a virtual mobile switching center to which the short message (SMS) is to be sent;

wherein the external short-message entity is simulated to the short message-service center of the foreign network;

wherein the inquiry requests an indication of whether the receiver number is a real mobile telephone of the home network or is reserved to a software application;

wherein the reply informs the short-message service center of an existence of the real mobile telephone and an associated entry in the virtual mobile switching center.

2. A system according to claim 1, characterized in that the inquiry of the short-message service center of the foreign network to the home network and the reply of the home network to the short-message service center of the foreign network as well as the transmission of the short message (SMS) to the virtual mobile switching center are accomplished using an SS7 (signaling system no. 7) protocol.

3. A system according to claim 1, characterized in the transmission of the short message (SMS) between the virtual mobile switching center and the external short-message entity, or a data network comprising the external short-message entity, including the internet, is accomplished using a TCP/IP (transmission control protocol/internet protocol)-based protocol.

4. A system according to claim 3, characterized in that the transmission of the short message (SMS) between the virtual mobile switching center and the external short-message entity, or a data network comprising the external short-message entity, including the internet, is accomplished using a short-message peer-to-peer protocol (SMPP).

5. A system according to claim 1, characterized in that the external short-message entity is comprised of a computer arranged in a data network, including the internet.

6. A system according to claim 5, characterized in that the connection between the computer in the data network and the home mobile radio network is comprised of a network connection.

7. A method for routing short messages (SMS) comprises:
sending a short message by a mobile terminal from a foreign network to an external short message entity;

transmitting an inquiry by a short message service center of the foreign network about the validity or availability of a receiver number of the external short message entity to a home network;

receiving the inquiry from the short message service center of the foreign network by a virtual home location register of the home network;

replying to the inquiry from the short message service center of the foreign network with an acknowledgment including information on a virtual mobile switching center of the home network and the validity of the receiver number of the external short message entity; and transmitting the short message by the short message service center of the foreign network to the external short message entity within the home network via the virtual mobile switching center of the home network;

wherein the external short message entity is different than the mobile terminal;

wherein the external short message entity is connected with the home network; wherein the inquiry is based on the receiver number of the external short message entity;

wherein the external short message entity is simulated to the short message service center of the foreign networks;

wherein the inquiry requests an indication of whether the receiver number is a real mobile telephone of the home network or is reserved to a software application;

wherein the reply informs the short message service center of an existence of the real mobile telephone and an associated entry in the virtual mobile switching center.

8. The method of claim 7, wherein the inquiry and the reply to the inquiry are accomplished using a SS7 protocol.

9. The method of claim 7, wherein the virtual mobile switching center transmits the short message to the external short message entity or to a data network including the external short message entity utilizing a TCP/IP based protocol.

10. The method of claim 9, wherein the virtual mobile switching center transmits the short message to the external short message entity or to the data network including the external short message entity utilizing a short message peer-to-peer protocol (SMPP).

11. The method of claim 7, wherein the external short message entity includes a computer arranged in a data network.

12. The method of claim 11, wherein the external short message entity is connected with the home network via a network connection between the home network and the data network.

13. The method of claim 7, wherein the external short message entity is connected with the home network via a home mobile radio network.

14. The method of claim 7, wherein the short message service center of the foreign network does not require a data line to the external short message entity.

15. The method of claim 7, wherein the external short message entity is a second mobile terminal.

16. The method of claim 7, wherein the external short message entity is the software application.

17. The method of claim 7, where the virtual mobile switching center and the virtual home location registry utilize a single computer.

18. The method of claim 7, wherein the short message service center sends a mobile application part (MAP) command to the virtual home location register.

19. A computer-implemented method for routing short messages (SMS) comprises:
step for sending a short message by a mobile terminal from a foreign network to an external short message entity;

step for transmitting an inquiry by a short message service center of the foreign network about the validity or availability of a receiver number of the external short message entity to a home network;

step for receiving the inquiry from the short message service center of the foreign network by a virtual home location register of the home network;

step for replying to the inquiry from the short message service center of the foreign network with an acknowledgement including information on a virtual mobile switching center of the home network and the validity of the receiver number of the external short message entity; and step for transmitting the short message by the short message service center of the foreign network to the external short message entity within the home network via the virtual mobile switching center of the home network;

wherein the external short message entity is different that the mobile terminal;

wherein the external short message entity is connected with the home network;

wherein the inquiry is based on the receiver number of the external short message entity;

wherein the external short message entity is simulated to the short message service center of the foreign network;

wherein the inquiry requests an indication of whether the receiver number is a real mobile telephone of the home network or is reserved to a software application;

wherein the reply informs the short message service center of an existence of the real mobile telephone and an associated entry in the virtual mobile switching center.

20. The computer-implemented method of claim 19, wherein the inquiry and the reply to the inquiry are accomplished using a SS7 protocol.

21. The computer-implemented method of claim 19, wherein the virtual mobile switching center transmits the short message to the external short message entity or to a data network including the external short message entity utilizing a TCP/IP based protocol.

22. The computer-implemented method of claim 21, wherein the virtual mobile switching center transmits the short message to the external short message entity or to the data network including the external short message entity utilizing a short message peer-to-peer protocol (SMPP).

23. The computer-implemented method of claim 19, wherein the external short message entity includes a computer arranged in a data network.

24. The computer-implemented method of claim 23, wherein the external short message entity is connected with the home network via a network connection between the home network and the data network.

* * * * *

UNITED STATES PATENT AND TRADEMARK OFFICE
CERTIFICATE OF CORRECTION

| | |
|---|---|
| PATENT NO. | : 7,568,012 B2 |
| APPLICATION NO. | : 10/111316 |
| DATED | : July 28, 2009 |
| INVENTOR(S) | : Hantsch et al. |

It is certified that error appears in the above-identified patent and that said Letters Patent is hereby corrected as shown below:

Col. 10, line 23; replace "networks;" with -- network; --;
Col. 11, lines 9-10; replace "acknowledgement" with -- acknowledgment --;
Col. 11, line 18; replace "that" with -- than --.

Signed and Sealed this
Twentieth Day of December, 2011

David J. Kappos
*Director of the United States Patent and Trademark Office*